US011370378B2

(12) United States Patent
Hotta et al.

(10) Patent No.: US 11,370,378 B2
(45) Date of Patent: Jun. 28, 2022

(54) STEERING WHEEL AIRBAG

(71) Applicant: TOYODA GOSEI CO., LTD., Kiyosu (JP)

(72) Inventors: Masashi Hotta, Kiyosu (JP); Koji Kawamura, Kiyosu (JP); Yuji Sato, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/183,918

(22) Filed: Feb. 24, 2021

(65) Prior Publication Data

US 2021/0179002 A1 Jun. 17, 2021

Related U.S. Application Data

(63) Continuation of application No. 15/912,838, filed on Mar. 6, 2018, now abandoned.

(30) Foreign Application Priority Data

Mar. 29, 2017 (JP) .............................. JP2017-066121

(51) Int. Cl.
*B60R 21/203* (2006.01)
*B60R 21/2338* (2011.01)
(Continued)

(52) U.S. Cl.
CPC ........ *B60R 21/2035* (2013.01); *B60R 21/233* (2013.01); *B60R 21/2338* (2013.01);
(Continued)

(58) Field of Classification Search
CPC ................................................ B60R 21/2338
See application file for complete search history.

(56) References Cited

U.S. PATENT DOCUMENTS 6,254,130 B1   7/2001  Jayaraman et al.
6,536,799 B2   3/2003  Sinnhuber et al.
(Continued)

FOREIGN PATENT DOCUMENTS

CN   113459989 A   * 10/2021   ........... B60R 21/203
GB     2237248 A     5/1991
(Continued)

OTHER PUBLICATIONS

Office Action dated Oct. 12, 2021, issued in corresponding JP Patent Application No. 2020-184632 (and English Machine Translation).
(Continued)

*Primary Examiner* — Nicole T Verley
(74) *Attorney, Agent, or Firm* — Posz Law Group, PLC

(57) ABSTRACT

A steering wheel airbag, arranged to cover a steering wheel when inflation is completed, includes: a front-collision receiving surface which is arranged on a side of a driver when inflation is completed, so as to receive the driver moving forward during a head-on collision of a vehicle, the front-collision receiving surface being arranged substantially along a vertical direction to be tilted with respect to a ring surface of the steering wheel when inflation is completed; and arm restraining parts which are arranged near arms of the driver steering a ring part of the steering wheel on both right and left sides of the front-collision receiving surface when inflation is completed, the arm restraining parts coming into contact with the arms during an oblique collision or an offset collision of the vehicle, so as to prevent a movement of the driver to an obliquely front side.

4 Claims, 15 Drawing Sheets

(51) Int. Cl.
  *B60R 21/233* (2006.01)
  *B60R 21/00* (2006.01)
(52) U.S. Cl.
  CPC .............. *B60R 2021/0004* (2013.01); *B60R 2021/0009* (2013.01); *B60R 2021/0041* (2013.01); *B60R 2021/23324* (2013.01); *B60R 2021/23382* (2013.01)

(56) References Cited

U.S. PATENT DOCUMENTS

| | | | |
|---|---|---|---|
| 6,626,459 | B2 | 9/2003 | Takimoto et al. |
| 7,195,281 | B2 | 3/2007 | Williams et al. |
| 7,198,290 | B2 | 4/2007 | Yamada et al. |
| 7,344,152 | B2 | 3/2008 | Matsumura |
| 7,360,791 | B2 | 4/2008 | Yamada |
| 7,571,931 | B2 | 8/2009 | Watanabe |
| 7,922,191 | B2 | 4/2011 | Choi |
| 8,678,429 | B2 | 3/2014 | Nagasawa et al. |
| 8,794,667 | B2 | 8/2014 | Bruzzone et al. |
| 8,899,618 | B2 | 12/2014 | Eckert et al. |
| 9,499,119 | B2 | 11/2016 | Ishiguro et al. |
| 9,738,242 | B2 | 8/2017 | Ishiguro et al. |
| 9,771,047 | B2 | 9/2017 | Kruse et al. |
| 10,414,370 | B2 | 9/2019 | Schneider et al. |
| 10,421,427 | B2 | 9/2019 | Nakanishi et al. |
| 2005/0098992 | A1 | 5/2005 | Yamada et al. |
| 2005/0206138 | A1 | 9/2005 | Breuninger et al. |
| 2005/0206147 | A1 | 9/2005 | Sievers |
| 2005/0212276 | A1 | 9/2005 | Yamada |
| 2006/0157958 | A1 | 7/2006 | Heudorfer et al. |
| 2010/0276915 | A1 | 11/2010 | Breuninger et al. |
| 2010/0276916 | A1 | 11/2010 | Breuninger et al. |
| 2013/0181429 | A1 | 7/2013 | Weng et al. |
| 2015/0239422 | A1 | 8/2015 | Ishiguro et al. |
| 2016/0288755 | A1 | 10/2016 | Ishiguro et al. |
| 2018/0361980 | A1 | 12/2018 | Schneider et al. |
| 2019/0077358 | A1 | 3/2019 | Fujimaki et al. |
| 2019/0193671 | A1* | 6/2019 | Hotta ................. B60R 21/2338 |
| 2019/0308580 | A1 | 10/2019 | Choi |
| 2021/0094498 | A1* | 4/2021 | Takahashi ............. B60R 21/233 |

FOREIGN PATENT DOCUMENTS

| | | | | |
|---|---|---|---|---|
| GB | 2387148 | A | 10/2003 | |
| GB | 2498439 | A * | 7/2013 | ........... B60R 21/203 |
| JP | H03-43057 | U | 4/1991 | |
| JP | H07-069151 | A | 3/1995 | |
| JP | H09-011837 | A | 1/1997 | |
| JP | 2005-104323 | A | 4/2005 | |
| JP | 2005-271736 | A | 10/2005 | |
| JP | 2006-069384 | A | 3/2006 | |
| JP | 2006-137414 | A | 6/2006 | |
| JP | 2006-273285 | A | 10/2006 | |
| JP | 2007-050851 | A | 3/2007 | |
| JP | 2007-261410 | A | 10/2007 | |
| JP | 2007-302192 | A | 11/2007 | |
| JP | 2007-320503 | A | 12/2007 | |
| JP | 5206722 | B2 | 6/2013 | |
| JP | 5630405 | B2 | 11/2014 | |
| JP | 6383303 | B2 | 8/2018 | |
| JP | 2019112043 | A * | 7/2019 | ........... B60R 21/203 |
| WO | 2018004153 | A1 | 11/2014 | |

OTHER PUBLICATIONS

Office Action dated Feb. 25, 2020 issued in corresponding JP patent application No. 2017-066121 (and English translation).

\* cited by examiner

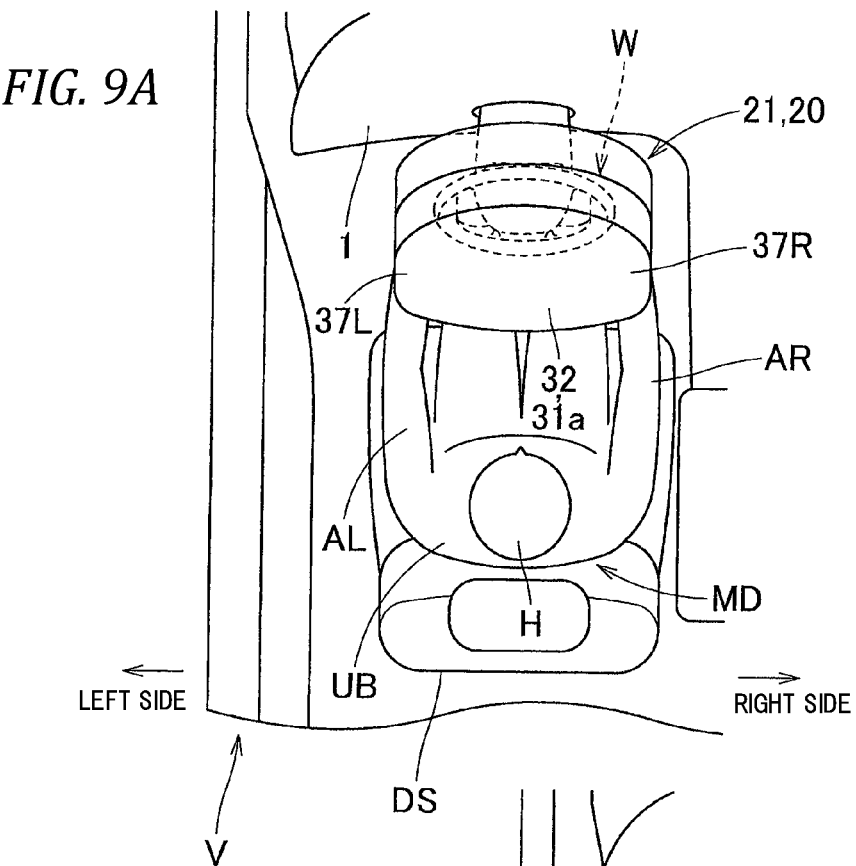
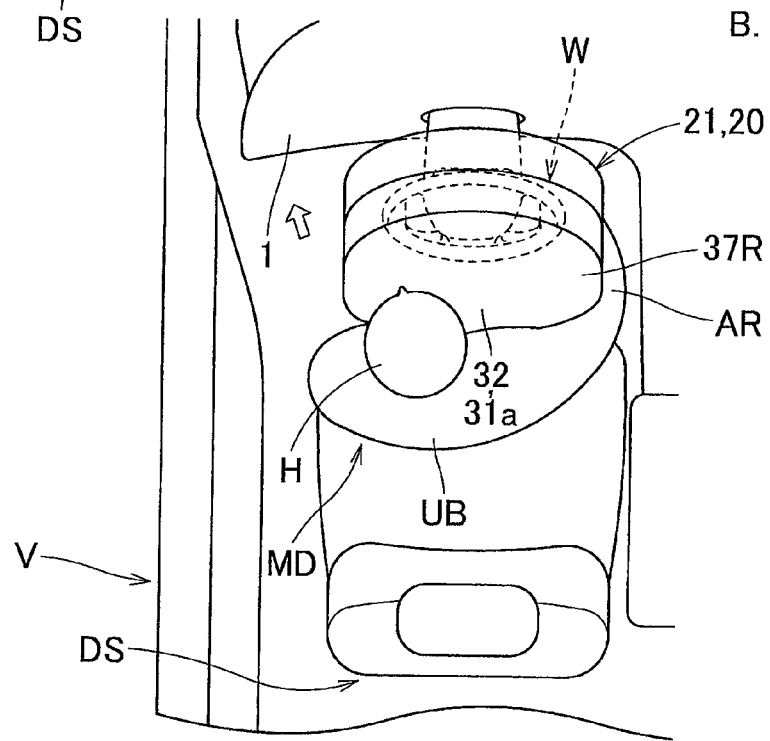

STEERING WHEEL AIRBAG

CROSS-REFERENCE TO RELATED APPLICATION(S)

This application is a continuation of U.S. patent application Ser. No. 15/912,838 filed on Mar. 6, 2018, and is based upon and claims the benefit of priority from Japanese Patent Application No. 2017-066121, filed on Mar. 29, 2017, the entire contents of which are incorporated herein by reference.

BACKGROUND

1. Field of the Invention

The invention relates to a steering wheel airbag which is inflated by allowing inflation gas therein and is arranged to cover a steering wheel when inflation is completed.

2. Description of the Related Art

In the related art, a steering wheel airbag is configured to be housed in an instrument panel on a front side of a steering wheel in a folded state and to cover the steering wheel when inflation is completed, and configured such that a driver-side wall part which is arranged on a driver side when inflation is completed is substantially along a vertical direction (for example, see JP-A-9-11837).

In the steering wheel airbag of the related art, the driver-side wall part is arranged substantially along the vertical direction when inflation is completed. In other words, on the front side of the driver, the driver-side wall part is arranged to confront the upper body of the driver.

However, in the steering wheel airbag of the related art, it is not considered that the driver is protected during the collision state, in which impact is applied from an obliquely front side, such as oblique collision or offset collision of a vehicle. There is room for improvement in that the driver is protected accurately even when an impact force is applied from the obliquely front side.

SUMMARY

The invention was made to solve the above-described problems, and an object thereof is to provide a steering wheel airbag which can accurately protect a driver during a vehicle collision although a driver during the vehicle collision is moved in various directions.

According to an aspect of the invention, there is provided a steering wheel airbag which is inflated by allowing inflation gas to flow therein, and is arranged to cover a steering wheel when inflation is completed, the steering wheel airbag including: a front-collision receiving surface which is arranged on a side of a driver when inflation is completed, so as to receive the driver moving forward during a head-on collision of a vehicle, the front-collision receiving surface being arranged substantially along a vertical direction to be tilted with respect to a ring surface of the steering wheel when inflation is completed; and arm restraining parts which are arranged near arms of the driver steering a ring part of the steering wheel on both right and left sides of the front-collision receiving surface when inflation is completed, the arm restraining parts coming into contact with the arms during an oblique collision or an offset collision of the vehicle, so as to prevent a movement of the driver to an obliquely front side.

In the steering wheel airbag of the invention, on both right and left sides of the front-collision receiving surface at the time of completion of inflation, the arm restraining parts are arranged near the arms of the driver steering the ring part. The arm restraining parts come into contact with the arms during the oblique collision or the offset collision of the vehicle, so as to prevent the movement of the driver to the obliquely front side. For this reason, in the steering wheel airbag of the invention, the inflating arm restraining parts come into contact with the arms of the driver during the oblique collision or the offset collision of the vehicle. The arm restraining parts and the arms of the driver themselves regulate that the upper body of the driver moves forward toward the obliquely front side, and it can be accurately regulated that the driver moves to the obliquely front side. In addition, in the steering wheel airbag of the invention, the front-collision receiving surface which can receive the driver moving forward during the head-on collision of the vehicle is arranged substantially along the vertical direction to be tilted with respect to the ring surface of the steering wheel when inflation is completed. Thus, during the head-on collision of the vehicle, the front-collision receiving surface prevents that the upper body (including a head part) of the driver moving forward is excessively pressed locally, so as to accurately restrain the upper body.

Therefore, in the steering wheel airbag of the invention, even in a case where the driver at the time of the vehicle collision is moved in various directions, the driver can be accurately protected during the vehicle collision.

the above-described steering wheel airbag may include: an airbag body having a bag shape; and a tether which is arranged in the airbag body to regulate an inflation completion shape of the airbag body, the airbag body may include a driver-side wall part forming a front-collision restraining surface and a vehicle-side wall part which is arranged on a side of the steering wheel to face the driver-side wall part when inflation is completed, and may be provided with an inflow opening for allowing the inflation gas to flow therein in the vehicle-side wall part, and the tether may connect the driver-side wall part and the vehicle-side wall part in an area which is on a rear side from the inflow opening in an axis-orthogonal direction of a steering shaft for assembling the steering wheel, so as to regulate a thickness of a rear area of the airbag body at the time of completion of inflation when the airbag body is inflated completely.

When the steering wheel airbag is configured as above, the thickness of the rear area of the airbag body at the time of completion of inflation is regulated by the tether. Thus, when the airbag is deployed and inflated, even in a case where the gap between a portion of the ring part on the rear end side and the abdomen of the driver in the steering wheel is narrow, the rear area of the airbag body can enter smoothly the narrow gap, and the airbag body can be inflated rapidly.

In the above-described steering wheel airbag, the tethers may be arranged in two places substantially symmetrical in the right and left direction with the inflow opening as a center, and have a belt shape. In a state where the airbag body at the time of completion of inflation is viewed along the axial direction of the steering shaft from above, the tethers are arranged to be tilted with respect to the right and left direction such that the end edge parts positioned on the right and left outer sides are positioned on the front side from the central edge parts positioned on the right and left inner sides. Thus, on the outside of the coupled portions of the tethers to the driver-side wall part with the inflow opening as a center, that is, in the vicinity of both right and left edges of the rear portion side of the driver-side wall part, the vicinity of the arm restraining parts can be inflated in a wide range to have a predetermined thickness, and the arms of the driver can be accurately restrained by the arm restraining parts without hindrance to state where a front-collision restraining surface is arranged substantially along the vertical direction.

In the steering wheel airbag of the invention, in a case where the tether is provided in the airbag body, the tether may be arranged to connect the substantially center of the front-collision restraining surface in the driver-side wall part and the vicinity of the inflow opening in the vehicle-side wall part, so as to secure a flat state near the substantially center of the front-collision restraining surface when the airbag body is inflated completely.

In a case where the steering wheel airbag is configured as above, when the airbag body is inflated completely, by preventing that an irregularity occurs partially, the front-collision restraining surface can be arranged in a wide flat area to be substantially along the vertical direction, and the driver moving forward can be received more stably by the confronting front-collision restraining surface having a wide flat shape.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIGS. 9A and 9B are schematic plan views illustrating two states where the airbag in the steering wheel airbag device of the embodiment is completely inflated and where the airbag receives the driver moving to an obliquely front side;

DETAILED DESCRIPTION OF THE INVENTION

Hereinafter, one embodiment of the invention will be described on the basis of the drawings. A steering wheel airbag (hereinafter, referred to as "airbag") 20 of the embodiment is used in a steering wheel airbag device (hereinafter, referred to as "airbag device") M mounted in a steering wheel W illustrated in FIGS. 1 and 2.

Incidentally, front and rear directions, upper and lower directions, right and left directions in the embodiment are based on a straight steering of the steering wheel W mounted in the vehicle V unless particularly is limited. The front and rear sides, the upper and lower sides, and the right and left sides are indicated such that the upper and lower sides along an axial direction of a steering shaft SS (see FIG. 2) for assembling the steering wheel W are set as an upper and lower direction, the front and rear sides of the vehicle V as an axis-orthogonal direction of the steering shaft SS are set as a front and rear direction, and the right and left sides of the vehicle V as an axis-orthogonal direction of the steering shaft SS are set as a right and left direction.

Figure 1:
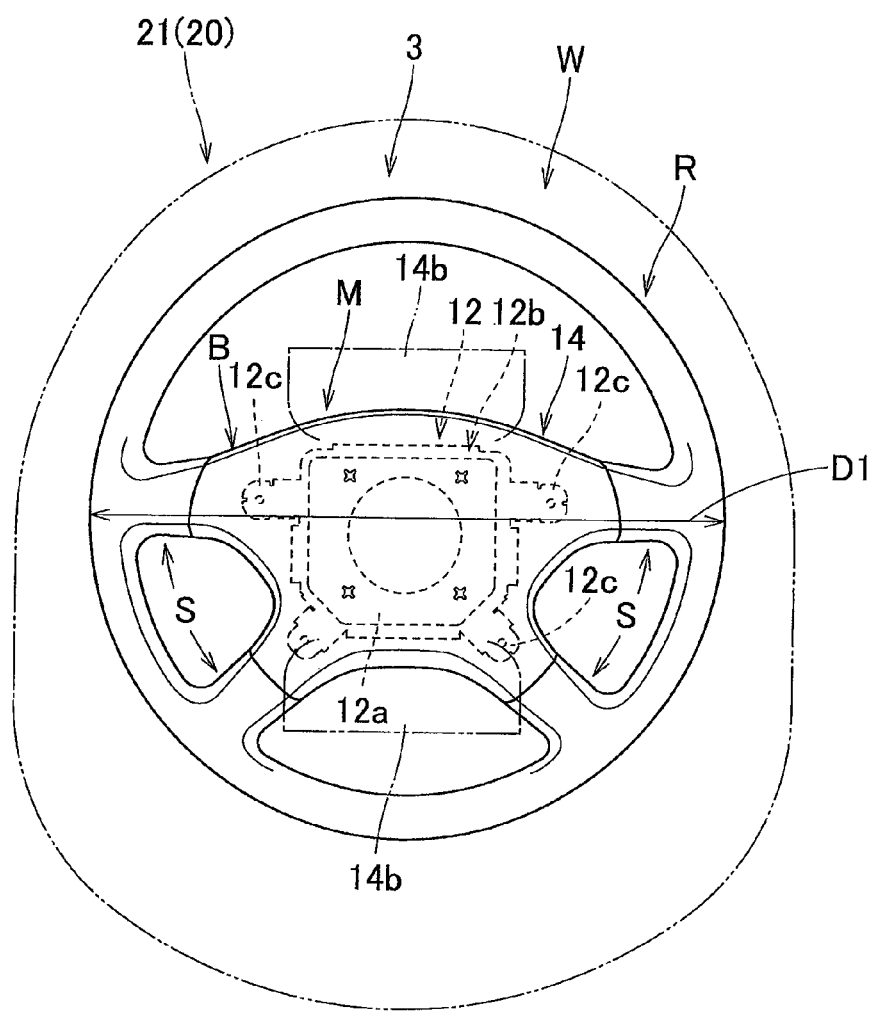
FIG. 1 is a schematic plan view illustrating a steering wheel airbag device which uses a steering wheel airbag as one embodiment of the invention.
Figure 2:
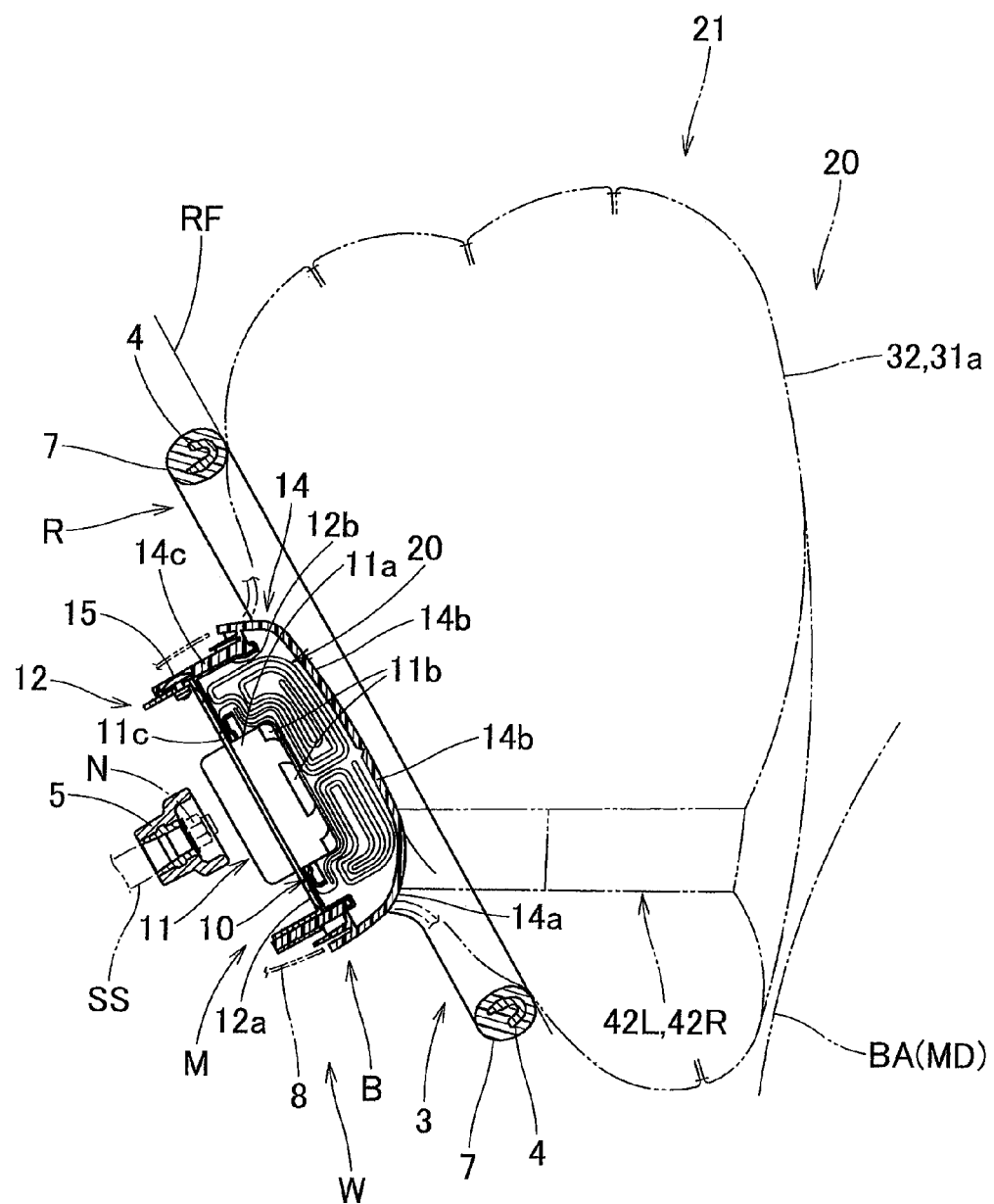
FIG. 2 is a schematic longitudinal sectional view when the steering wheel airbag device of FIG. 1 is mounted in a vehicle.
Figure 3:
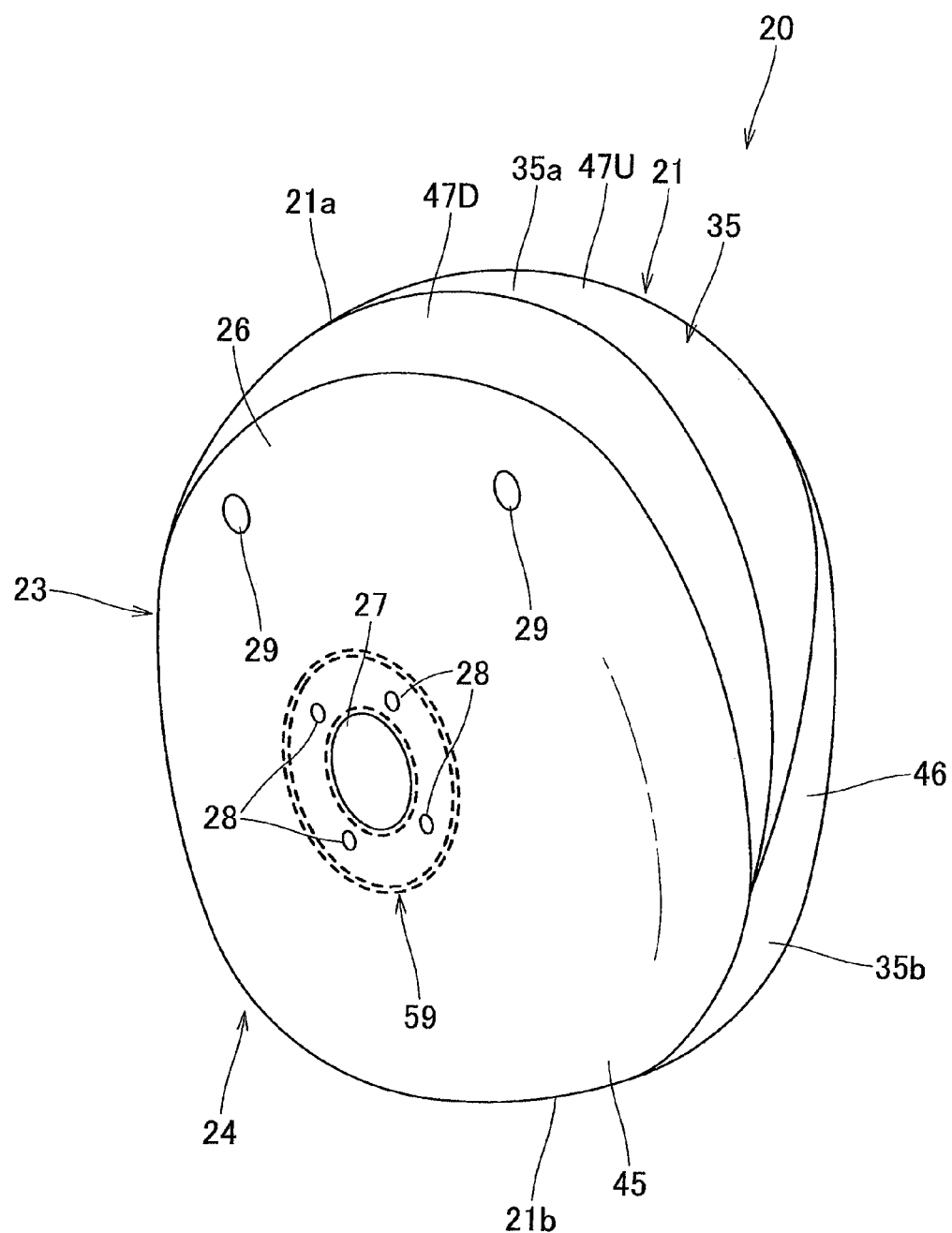
FIG. 3 is a perspective view illustrating a state where the airbag used in the steering wheel airbag device of FIG. 1 is inflated as a single body when viewed from a front side.
Figure 4:
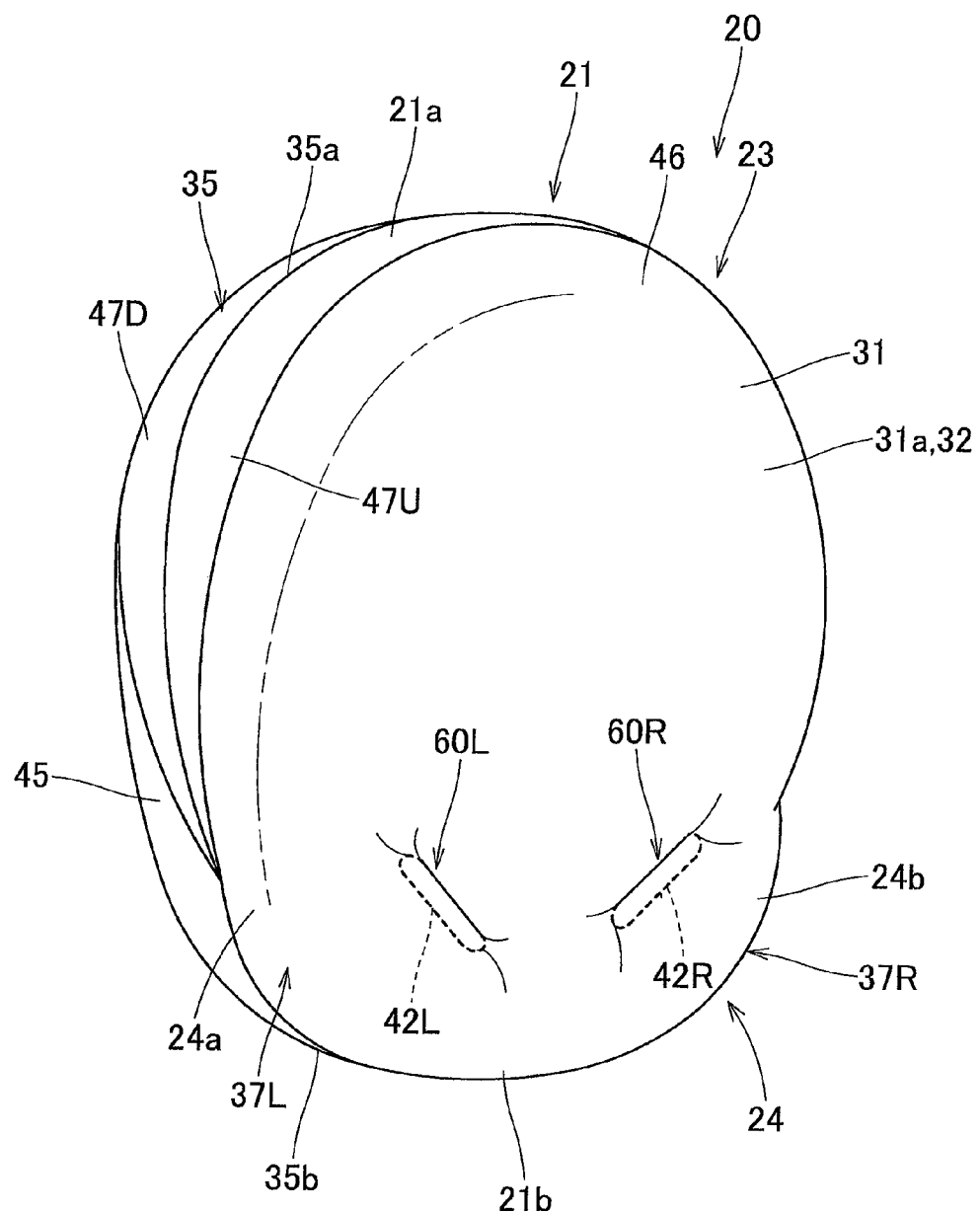
FIG. 4 is a perspective view illustrating a state where the airbag of FIG. 3 is inflated as a single body when viewed from a rear side.

As illustrated in FIG. 9A, in the case of the embodiment, on a front side of a driver seat DS in the vehicle V, the steering wheel W is arranged to protrude from an instrument panel (hereinafter, referred to as "instrument panel") 1. As illustrated in FIGS. 1 and 2, the steering wheel W includes a steering wheel body 3 and an airbag device M which is arranged in an upper portion of a boss part B in the center of the steering wheel body 3. The steering wheel body 3 includes an annular ring part R gripped during steering, the boss part B which is arranged in the substantially center of the ring part R to be connected in the steering shaft SS, and a plurality of (four in the case of the embodiment) spoke parts S which connect the boss part B and the ring part R.

As illustrated in FIG. 2, the steering wheel body 3 includes a cored bar 4 which is arranged to connect the portions of the ring part R, the boss part B, and the spoke part S and is made of metal such as aluminum alloy. A portion of the ring part R in the cored bar 4 and a portion on the ring part R side in the each of the spoke parts S are coated with a synthetic resin coating layer 7. In addition, a steel boss 5 for inserting the steering shaft SS to be fastened with nuts is provided in a portion of the boss part B in the cored bar 4. In addition, a synthetic resin lower cover 8 which covers the lower side of the boss part B is provided in the lower portion of the steering wheel body 3.

As illustrated in FIGS. 1 and 2, the airbag device M is arranged in the boss part B in the substantially center of the steering wheel W. The airbag device M includes an airbag 20 which is housed in a folded state, an inflator 11 which supplies inflation gas to the airbag 20, a case 12 as a housing portion which houses and holds the airbag 20 and the inflator 11, an airbag cover 14 which covers the folded airbag 20, and a retainer 10 which attaches the airbag 20 and the inflator 11 in the case 12.

As illustrated in FIG. 2, the inflator 11 includes a substantially columnar main body part 11a having a plurality of gas discharge outlets 11b and a flange part 11c which attaches the inflator 11 in the case 12. In the case of the embodiment, the inflator 11 is to be operated during the head-on collision, the oblique collision, and the offset collision of the vehicle V.

The case 12 as a housing portion is made of sheet metal. As illustrated in FIG. 2, the case 12 includes a bottom wall part 12a which has a substantially rectangular plate shape and in which the inflator 11 is inserted from below to be attached, and a circumferential wall part 12b which extends to the upper and lower sides from the outer circumferential edge of the bottom wall part 12a. An attaching piece 12c which extends outward is formed in the upper end of the circumferential wall part 12b (see FIG. 1). An attaching substrate of a horn switch mechanism (not illustrated) is attached in the attaching piece 12c. Further, by using the attaching substrate (not illustrated), the case 12 is attached and fixed in the cored bar 4 of the steering wheel W. The airbag device M is mounted in the upper portion of the boss part B of the steering wheel body 3 having mounted in the steering shaft SS. In addition, a side wall part 14c of the airbag cover 14 is attached in the circumferential wall part 12b of the case 12 by using a rivet or the like (see FIG. 2). In the case of the embodiment, by using a bolt (not illustrated) of the retainer 10 arranged in the airbag as an attaching unit, the airbag 20 and the inflator 11 are attached in the bottom wall part 12a of the case 12 in such a manner that the bolt (not illustrated) is made pass through an attaching hole 28 of a circumferential edge of an inflow opening 27 in the airbag 20, the bottom wall part 12a of the case 12, and the flange part 11c of the inflator 11, and is fastened with nuts (not illustrated).

The airbag cover 14 includes a ceiling wall part 14a which is made of synthetic resin and covers the upper side of the airbag 20 housed in the case 12, and a side wall part 14c which extends downward from the vicinity of the outer circumferential edge of the ceiling wall part 14a and has a substantially rectangular tubular shape. Two pieces of door parts 14b and 14b which are opened to the front and rear sides by being pressed by the inflating airbag 20 are formed in the ceiling wall part 14a.

As illustrated in FIGS. 3 to 6, the airbag 20 includes a bag-shaped airbag body 21 having flexibility, a flow-straightening cloth 40 arranged in the airbag body 21, and tethers 42L and 42R which are arranged in the airbag body 21 to regulate the inflation completion shape of the airbag body 21.

As illustrated by the two-dot chain line of FIG. 1, the airbag body 21 is configured to cover the entire surface of the upper surface of the steering wheel W when inflation is completed. In the case of the embodiment, as illustrated in FIGS. 3 to 6, the inflation completion shape is formed to have a substantially ellipse shape in which the front and rear sides are slightly wide when viewed from the upper and lower direction, and formed such that a front end 21a is thick and becomes thinner toward a rear end 21b when viewed from the right and left direction. In addition, the airbag body 21 is set such that the width dimension in the right and left direction at the time of the completion of inflation is larger than a ring diameter D1 (see FIG. 1) of the ring part R in the steering wheel W.

The airbag body 21 includes a driver-side wall part 31 which is arranged on the driver MD side when inflation is completed, a vehicle-side wall part 26 which is arranged on the steering wheel W side to face the driver-side wall part 31, and the side wall part 35 which is arranged to connect the outer circumferential edges of the driver-side wall part 31 and the vehicle-side wall part 26. In the vehicle-side wall part 26, the inflow opening 27 in which the main body part 11a of the inflator 11 is inserted from below to allow the inflation gas discharged from the gas discharge outlet 11b of the inflator 11 to flow therein is formed in a substantially central position of the front and rear sides and the right and left sides, and is opened in a substantially circular shape. In addition, four attaching holes 28 for inserting a bolt (not illustrated) of the retainer 10 are formed in the circumferential edge of the inflow opening 27 in the vehicle-side wall part 26. Further, in the vehicle-side wall part 26, a valve and a hole 29 for exhausting excessive inflation gas having flowed in the airbag body 21 are formed in two places symmetrical in the right and left direction in the area in the vicinity of the front end which is a front side of the inflow opening 27.

Figure 8:
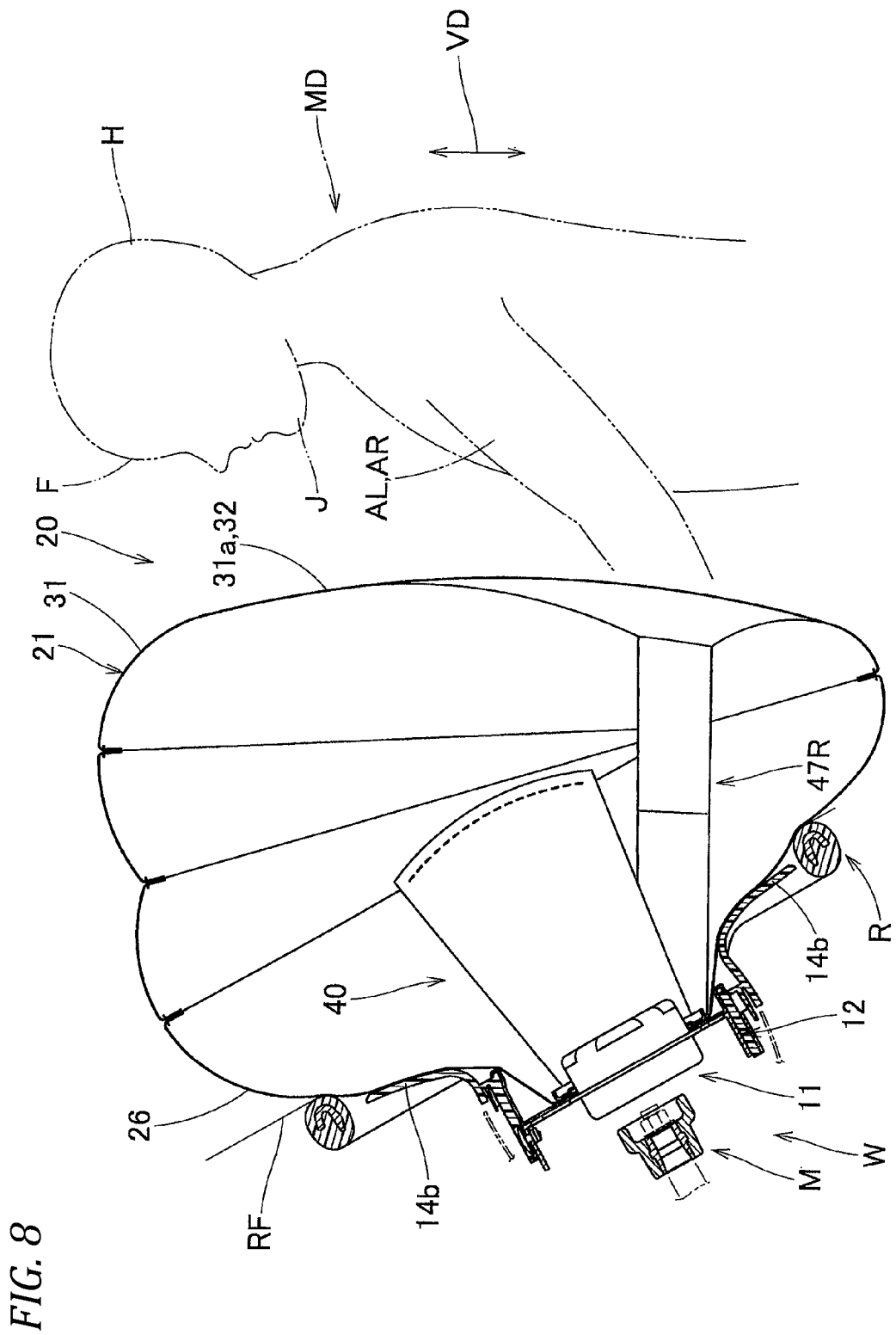
FIG. 8 is a schematic longitudinal sectional view illustrating a state where the airbag is completely inflated in the steering wheel airbag device of the embodiment.

In the airbag body 21, the side wall part 35 is formed such that the front end 35a is the widest and formed to be gradually reduced toward the rear end 35b when inflation is completed, and the inflation completion shape is formed such that the front end 21a is thick and becomes thinner toward the rear end 21b. In a state where the airbag body is arranged to cover the upper surface of the steering wheel W when inflation is completed, as illustrated in FIG. 8, the driver-side wall part 31 is tilted with respect to a ring surface RF of the steering wheel W and is arranged substantially along the vertical direction VD (see FIG. 8). Further, in the embodiment, an external surface (rear surface 31a) in the driver-side wall part 31 is arranged on the driver MD side when inflation is completed, so as to configure a front-collision receiving surface 32 which can receive the driver MD moving forward during the head-on collision of the vehicle V.

In addition, in the embodiment, as described above, the airbag body 21 is set such that the width dimension W1 (see FIG. 5) in the right and left direction at the time of the completion of inflation is larger than the ring diameter D1 (see FIG. 1) of the ring part R in the steering wheel W. In other words, the airbag body is arranged to project on both right and left sides from the ring part R. In the case of the embodiment, the width dimension W1 of the airbag body 21 in the right and left direction at the time of completion of inflation is set to be about 370 to 500 mm. In addition, the airbag body 21 is formed such that the width dimension in the front and rear direction is set to be slightly larger than the width dimension in the right and left direction, and is arranged to project to be larger than the ring part R to both front and rear sides when inflation is completed. Further, a ring body 21 is formed such that a portion on the rear end 21b side protrudes to be larger than a portion on the front end 21a side. Further, in the case of the embodiment, the airbag body 21 is formed such that the rear end 21b at the time of completion of inflation is arranged in a position near an abdomen BA of the driver MD (see FIG. 2).

Figure 5:
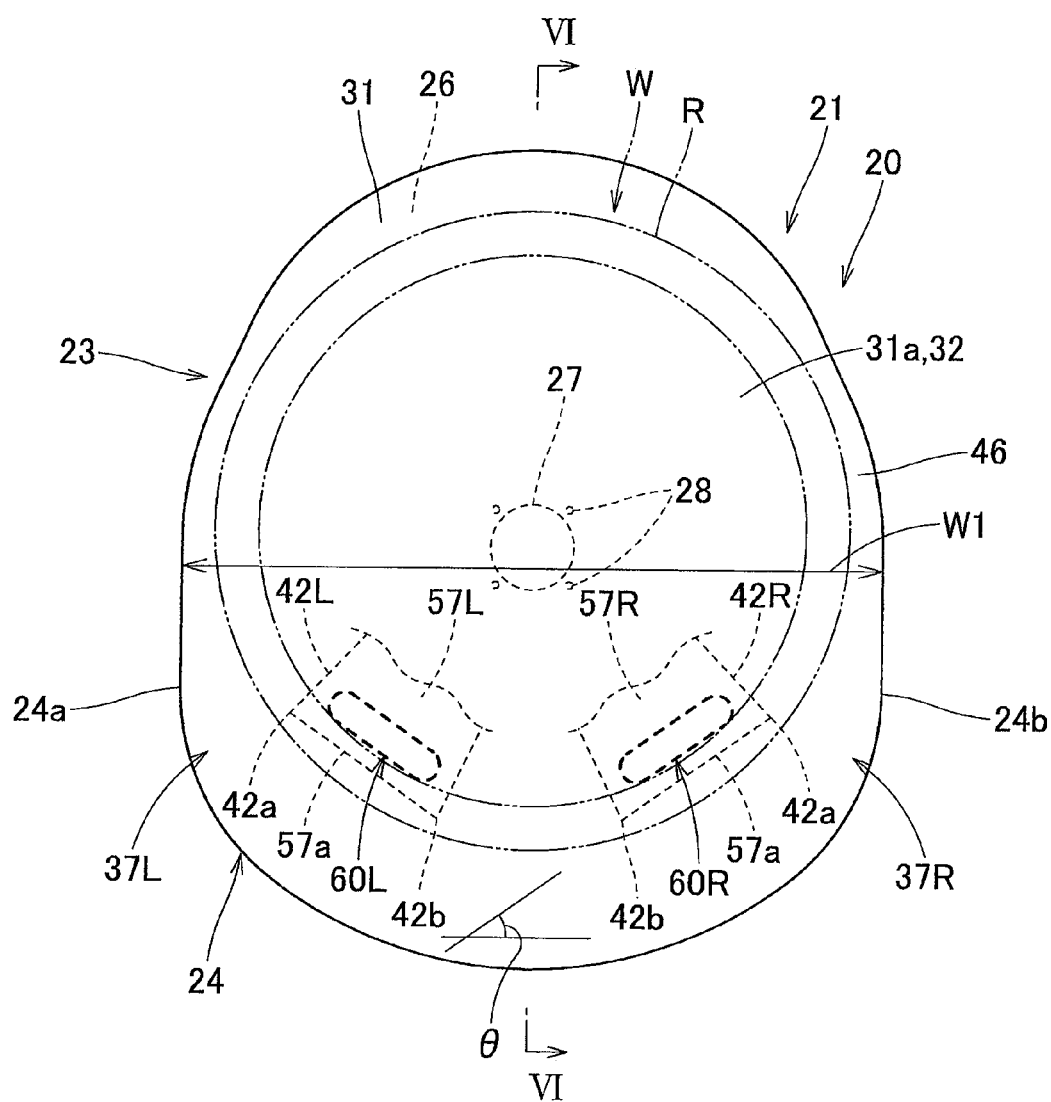
FIG. 5 is a plan view illustrating a state where the airbag of FIG. 3 is inflated as a single body.

Specifically, in the airbag body 21, a front portion 23 which is on the front side from the center of the inflow opening 27 has a substantially semicircular shape when viewed from above, and a rear portion 24 which is on a rear side from the center of the inflow opening 27 has a substantially rectangular shape in which the width dimension in the right and left direction is substantially constant such that a left edge 24a and a right edge 24b are substantially along the front and rear direction when viewed from above (see FIG. 5). In other words, the front portion 23 has a thick semicircular shape, and the rear portion 24 has a thin rectangular plate. Further, in the airbag body 21, the areas of the left edge 24a and the right edge 24b in the rear portion 24 are arranged near the arms AL and AR of the driver MD which steers the ring part R of the steering wheel W when inflation is completed. The areas configure arm restraining parts 37L and 37R which are arranged on both right and left sides of the front-collision receiving surface 32 when inflation is completed. The arm restraining parts 37L and 37R come into contact with the arms AL and AR of the driver MD during the oblique collision or the offset collision of the vehicle V when inflation is completed, so as to prevent the movement of the driver MD to the obliquely front side. That is, in the airbag body 21, the protruding amount (the width dimension of the rear portion 24 of the airbag body 21 in the right and left direction at the time of completion of inflation) from the ring part R of the arm restraining parts 37L and 37R, and a thickness dimension (the width dimension of the side wall part 35 in a portion of the rear portion 24) of the arm restraining parts 37L and 37R at the time of completion of inflation are set to be such a dimension that the arm restraining parts 37L and 37R have a moderate thickness and can be arranged to protrude to the right and left outer sides from the ring part R when the airbag 20 is inflated completely. The arm restraining parts 37L and 37R restrain the arms AL and AR opposite to the moving direction of the driver MD during the obliquely front side collision or the offset collision of the vehicle V, so as to prevent the movement of the driver MD to the obliquely front side. Specifically, in a case where the driver MD moves to the obliquely front left side, the arm restraining part 37R arranged on the right side is interposed between the ring part R and a right arm AR, so as to restrain the right arm AR of the driver MD and to prevent the movement of the driver MD toward the obliquely front left side. In a case where the driver MD moves toward the obliquely front right side, the arm restraining part 37L arranged on the left side becomes interposed between the ring part R and a left arm AL, so as to restrain the left arm AL of the driver MD and to prevent the movement of the driver MD toward the obliquely front right side.

Figure 6:
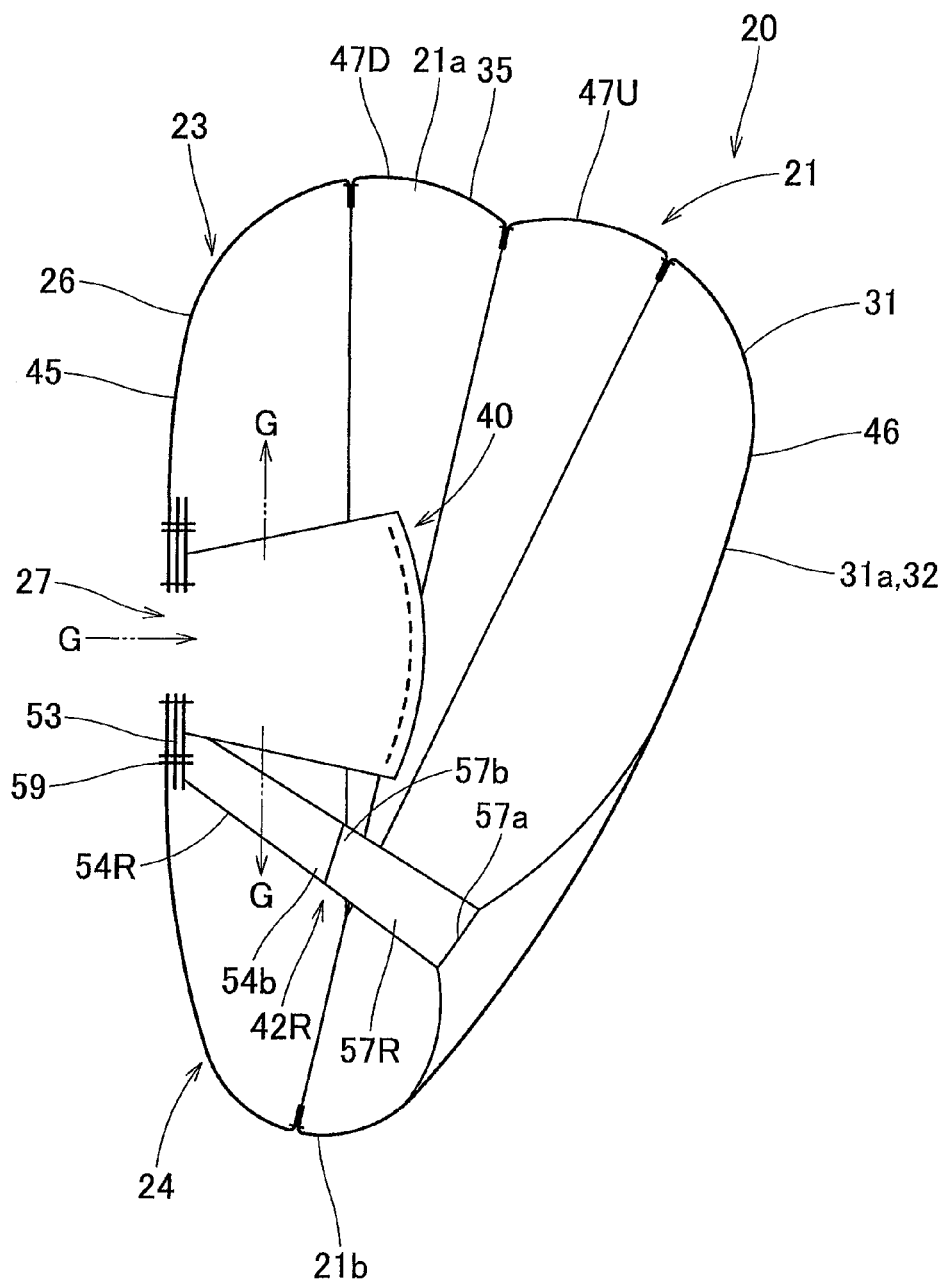
FIG. 6 is a sectional view of VI-VI portion of FIG. 5.

As illustrated in FIGS. 6 and 8, the flow-straightening cloth 40 arranged in the airbag body 21 is provided to cover the upper side of the inflow opening 27 when the airbag body 21 is inflated completely. The flow-straightening cloth 40 has a substantially cylindrical shape in which both ends in the front and rear direction are opened such that the flow of the inflation gas G having flowed from the inflow opening 27 can be straightened to the both front and rear sides. In the case of the embodiment, the flow-straightening cloth 40 is formed of a flow-straightening material 50 illustrated in FIG. 7. In the flow-straightening material 50, a central portion 50a is coupled (sewn) to the end edge of the inflow opening 27, and substantially fan-shaped left portion 50b and right portion 50c which are formed to project from the central portion 50a to the right and left sides are sewn (coupled) with each other in the outer circumferential edges, so as to configure the flow-straightening cloth 40.

As illustrated in FIG. 6, when the airbag body 21 is inflated completely, the tethers 42L and 42R arranged in the airbag body 21 connect the driver-side wall part 31 and the vehicle-side wall part 26 in the inner portion of the area of the rear portion 24 which is on the rear side from the inflow opening 27, so as to regulate the thickness of the rear portion 24 (rear area) of the airbag body 21 at the time of completion of inflation. Specifically, as illustrated in FIG. 5, the tethers 42L and 42R are arranged in two places substantially symmetrical in the right and left direction with the inflow opening 27 as a center, and each have a belt shape which is symmetrical in the right and left direction. The tethers 42L and 42R are arranged to be tilted with respect to the right and left direction such that end edge parts 42a positioned on the right and left outer sides are positioned on the front side from central edge parts 42b positioned on the right and left inner sides when the airbag body 21 at the time of completion of inflation is viewed from above. In detail, the tethers 42L and 42R (the coupled portions 60L and 60R in which the tethers 42L and 42R are coupled to the driver-side wall part 31) is set such that a tilt angle θ (see FIG. 5) is about 40° with respect to the right and left direction. Further, in the case of the embodiment, the tethers 42L and 42R (the coupled portions 60L and 60R in which the tethers 42L and 42R are coupled to the driver-side wall part 31) are arranged substantially along the ring part R to approach to the inside of the ring part R of the steering wheel W in a state where the airbag body 21 (airbag 20) at the time of completion of inflation is viewed from above (see FIG. 5).

Figure 7:
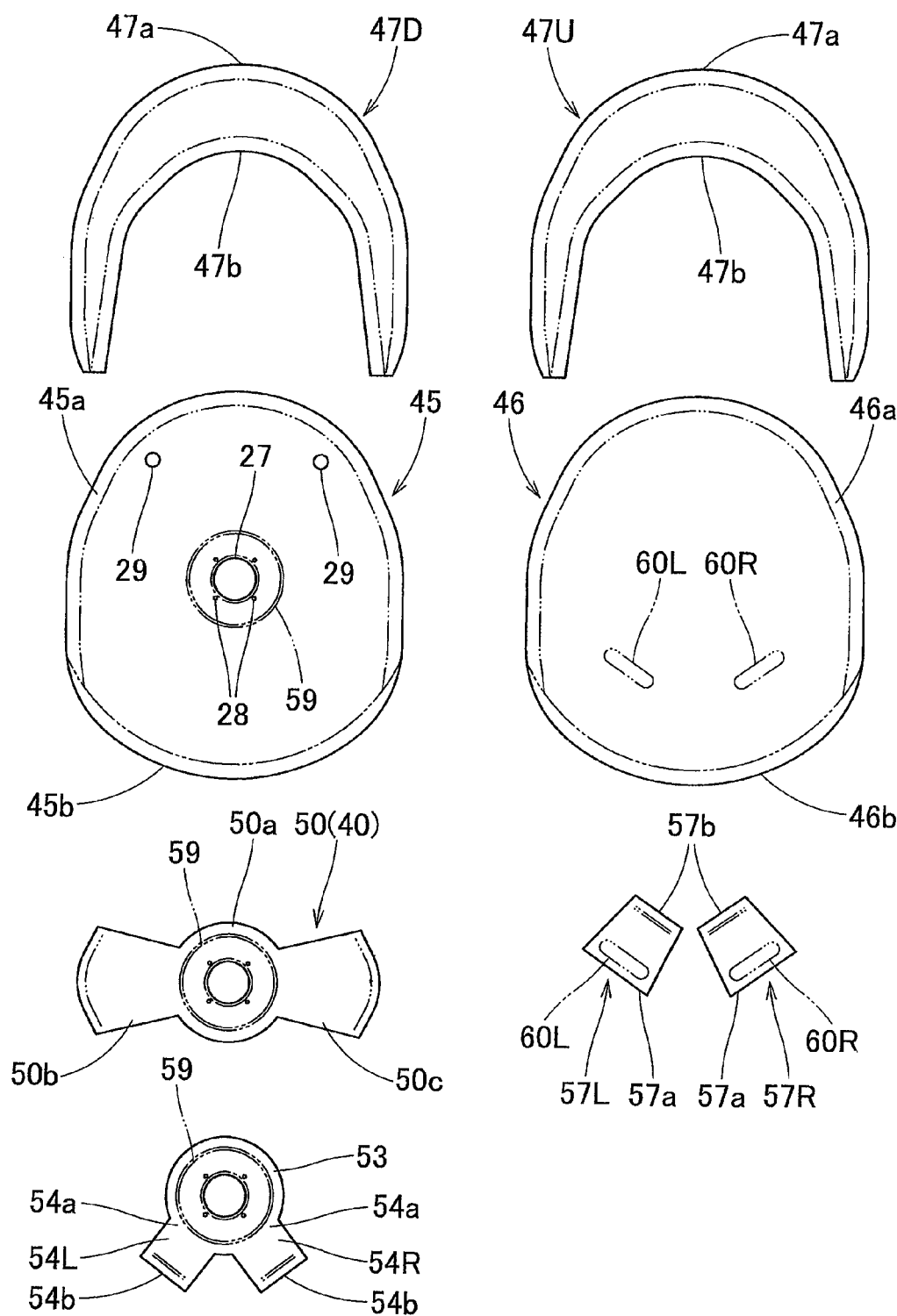
FIG. 7 is a plan view illustrating a basic fabric forming the airbag of the embodiment.

As illustrated in FIG. 6, the tethers 42L and 42R are formed by coupling (sewing) tips 54b and 56b of two pieces of the tether basic fabrics 54L, 54R, 57L, and 57R, which are formed to extend from the driver-side wall part 31 and the vehicle-side wall part 26 respectively, with each other. As illustrated in FIG. 7, the tether basic fabrics 57L and 57R on the driver-side wall part 31 are formed in a substantially trapezoidal shape to be slightly narrow toward the tip 57b. As illustrated in FIG. 7, the tether basic fabrics 54L and 54R which extend from the vehicle-side wall part 26 are formed integrally with a reinforcing fabric 53 to extend in a belt shape from the substantially circular reinforcing fabric 53 which reinforces the circumferential edge of the inflow opening 27. The tether basic fabrics 54L and 54R have a constant width dimension. Further, the vehicle-side wall part 26 (a root part 54a of the tether basic fabrics 54L and 54R) of the tethers 42L and 42R is sewn (coupled) with the vehicle-side wall part 26 when the outer circumferential edge of the reinforcing fabric 53 is sewn to the vehicle-side wall part 26 to form a substantially circular coupled portion (sewn portion) 59 (see FIGS. 3, 6, and 7). In addition, the driver-side wall part 31 (the root part 57a of the tether basic fabrics 57L and 57R) of the tethers 42L and 42R is sewn (coupled) to the driver-side wall part 31 by providing a linear coupled portion (sewn portion) 60L and 60R in a position which is on the rear side from the coupled portion 59 with the vehicle-side wall part 26 (see FIGS. 4 to 7). Specifically, the coupled portions 60L and 60R of the tethers 42L and 42R and the driver-side wall part 31 are arranged in a position which is slightly on the rear side from the center of the rear portion 24 of the airbag body 21 in the front and rear direction. Further, the tethers 42L and 42R are arranged in the vehicle mounted state to be tilted slightly to the rear and lower side with respect to the front and rear direction (see FIG. 8). The tethers 42L and 42R are set to have such a length dimension that a separation distance between the vehicle-side wall part 26 and the driver-side wall part 31 is regulated when the airbag 20 is inflated completely, and the driver-side wall part 31 can be arranged substantially along the vertical direction.

The airbag body 21 of the embodiment is formed in a bag shape by coupling the circumferential edges of the basic fabric having a predetermined shape to each other. As illustrated in FIG. 7, in the case of the embodiment, the airbag body 21 is formed of four pieces of the basic fabrics which are a vehicle-side panel 45 forming the vehicle-side wall part 26, a driver-side panel 46 forming the driver-side wall part 31, and two pieces of side wall-side panels 47U and 47D forming the side wall part 35.

The vehicle-side panel 45 and the driver-side panel 46 are formed in a substantially elliptical shape to have the same outer shape. Two pieces of the side wall-side panels 47U and 47D are formed in a curved belt shape such that the outer circumferential edge 47a substantially matches with the area in the outer circumferential edges 45a and 46a of the vehicle-side panel 45 and the driver-side panel 46 except for the rear edges 45b and 46b, and have the same outer shape. In the side wall-side panels 47U and 47D, the inner circumferential edge 47b is also formed to be curved substantially along an outer edge 47a, and to have the widest central area and to be converged toward both ends.

In the embodiment, the vehicle-side panel 45 forming the airbag body 21, the driver-side panel 46, the side wall-side panels 47U and 47D, the flow-straightening material 50 forming the flow-straightening cloth 40, the reinforcing fabric 53, and the tether basic fabrics 57L and 57R forming the tethers 42L and 42R are each formed of polyester-based or polyamide-based woven fabric having a flexibility.

Next, the description will be given about the manufacturing of the airbag 20 of the embodiment. In the vehicle-side panel 45, the reinforcing fabric 53 and the flow-straightening material 50 are superposed and sewn in a portion of the circumferential edge of the inflow opening 27 with a suture thread, so as to form the coupled portion (sewn portion) 59, and the inflow opening 27 and the attaching hole 28 are formed through a drilling process. The tether basic fabrics 57L and 57R are sewn to the driver-side panel 46 to form the coupled portions (sewn portion) 60L and 60R. In addition, the side wall-side panels 47U and 47D in a flatly-deployed state are superposed, and the inner circumferential edges 47b are sewn to each other with a suture thread. The outer circumferential edge 47a of the side wall-side panel 47U arranged on the upper side and the outer circumferential edges 46a of the driver-side panel 46 are sewn with a suture thread. Similarly, the outer circumferential edge 47a of the side wall-side panel 47D arranged on the lower side, and the outer circumferential edge 45a of the vehicle-side panel 45 are sewn with a suture thread. Thereafter, the bag-shaped airbag body 21 can be formed by sewing the rear edges 45b and 46b of the vehicle-side panel 45 and the driver-side panel 46 with a suture thread. After the airbag body 21 is inverted by using the inflow opening 27 such that a sewing margin is exposed to the outer portion, the tips 54b and 57b of the tether basic fabrics 54L, 54R, 57L, and 57R are sewn with a suture thread, so as to form the tethers 42L and 42R, and the airbag 20 can be manufactured when the outer circumferences of the left portion 50b and the right portion 50c in the flow-straightening material 50 sewn to form the flow-straightening cloth 40.

After the airbag 20 is manufactured, a bolt (not illustrated) protrudes from the attaching hole 28, and the airbag 20 is folded to be housed in the case 12 in a state where the retainer 10 is arranged therein. Thereafter, the folded airbag 20 is housed in the case 12, the main body part 11a of the inflator 11 is inserted from below, and the inflator 11 and the airbag 20 are attached in the case 12 by using a bolt (not illustrated) protruding from the bottom wall part 12a and a nut. Further, the case 12 is covered with the airbag cover 14, and the airbag cover 14 is attached in the case 12 by using the rivet 15 and the like. Thereafter, when the horn switch mechanism (not illustrated) is assembled with the attaching piece 12c of the case 12, the airbag device M can be assembled. The airbag device M can be mounted in the vehicle V by being attached in the steering wheel body 3 which is fastened in advance by the steering shaft SS by using the attaching substrate (not illustrated) of the horn switch mechanism.

In the airbag device M of the embodiment, when the inflation gas is discharged from the gas discharge outlet 11b of the inflator 11 during the head-on collision, the oblique collision, or the offset collision of the vehicle V in the state of being mounted in the vehicle V, the airbag 20 (airbag body 21) is inflated by allowing the inflation gas to flow therein, so as to press and open the door parts 14b and 14b of the airbag cover 14 and to protrude from the case 12. As illustrated in the two-dot chain line of FIGS. 1 and 2, and FIGS. 8 A and 10A, the airbag 20 is completely inflated to cover the almost entire surface of the upper surface of the steering wheel W.

Figure 10A:
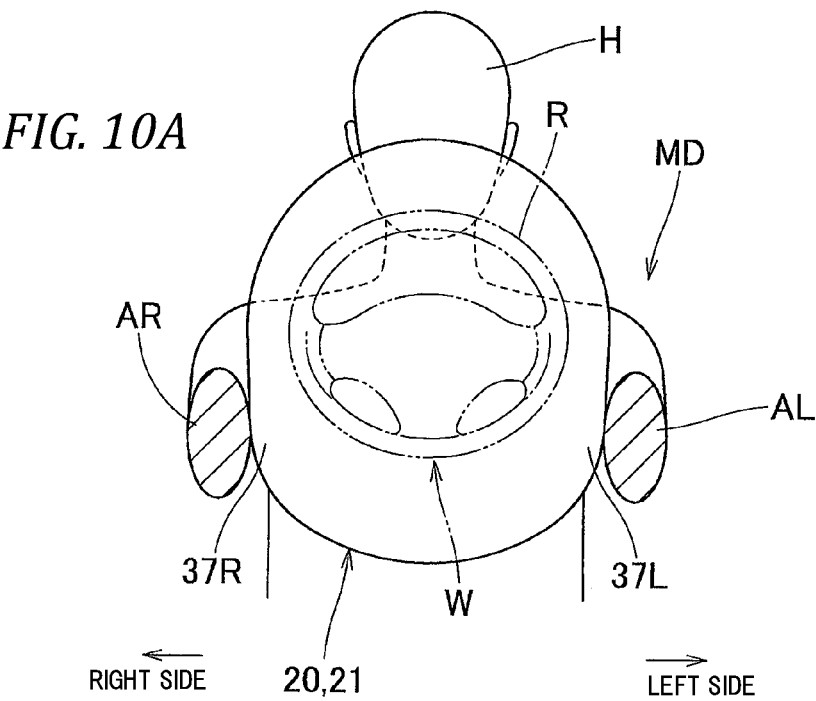
FIGS. 10A and 10B are schematic front views illustrating the two states where the airbag in the steering wheel airbag device of the embodiment is completely inflated and where the airbag receives the driver moving to the obliquely front side, when viewed from a vehicle front side.
Figure 10B:
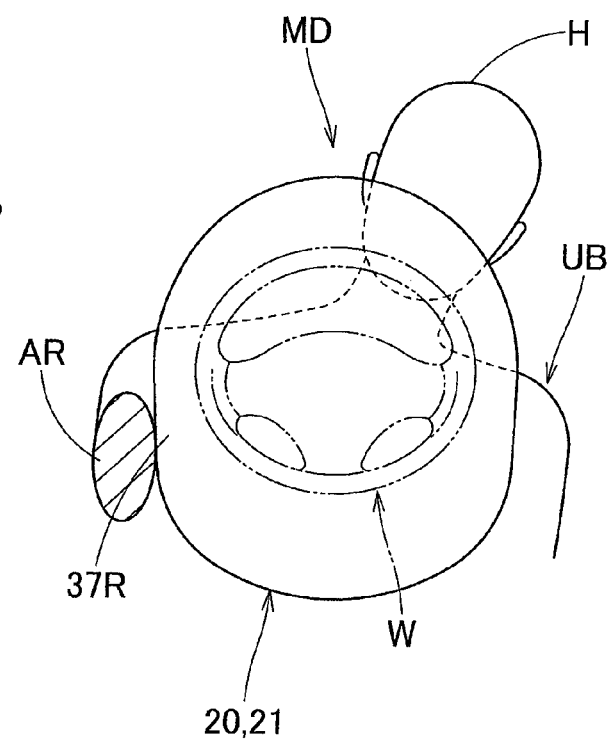

In the airbag 20 used in the airbag device M of the embodiment, on both right and left sides of the front-collision receiving surface 32 at the time of the completion of inflation, the arm restraining parts 37L and 37R are arranged near the arms AL and AR of the driver MD steering the ring part R. The arm restraining parts 37L and 37R come into contact with the arms AL and AR during the oblique collision or the offset collision of the vehicle V, so as to prevent the movement of the driver MD to the obliquely front side. For this reason, in the airbag 20 of the embodiment, the inflating arm restraining parts 37L and 37R come into contact with the arms AL and AR of the driver MD during the oblique collision or the offset collision of the vehicle V. The arm restraining parts 37L and 37R and the arms AL and AR of the driver MD themselves regulate that the upper body UB of the driver MD moves forward toward the obliquely front side, and it can be accurately regulated that the driver MD moves to the obliquely front side. In detail, the arm restraining parts 37L and 37R are arranged on the opposite side to the moving direction of the driver MD and restrain the arms AL and AR opposite to the moving direction, so as to prevent the movement of the driver MD to the obliquely front side. For example, as illustrated in FIGS. 9B and 10B, in a case where the driver MD moves to the obliquely front left side, the arm restraining part 37R arranged on the right side becomes interposed between the right arm AR gripping the ring part R and the ring part R. The right arm AR is restrained to prevent the movement of the driver MD toward the obliquely front left side. Further, in the driver MD of which the right arm AR is restrained by the arm restraining part 37R, the upper body UB is received and restrained by the airbag body 21.

In the airbag 20 of the embodiment, as illustrated in FIG. 8, the front-collision receiving surface 32 which can receive the driver MD moving forward during the head-on collision of the vehicle V is arranged substantially along the vertical direction to be tilted with respect to the ring surface RF of the steering wheel W when inflation is completed, in other words, the front-collision receiving surface 32 is arranged to be substantially along the upper body UB of the driver MD. Thus, during the head-on collision of the vehicle V, the front-collision receiving surface 32 prevents that the upper body UB (including a head part H) of the driver MD moving forward is excessively pressed locally, so as to accurately restrain the upper body. In detail, in the airbag 20 of the embodiment, the front-collision receiving surface 32 is arranged to be substantially along the vertical direction. Thus, when receiving the head part H, the front-collision receiving surface 32 can come into contact with a chin J and a forehead F in the head part H almost at the same time without a time difference. The rotation to depress the chin J is prevented so that the head part H can be rapidly received by the front-collision receiving surface 32.

Therefore, in the airbag 20 of the embodiment, although the driver MD at the time of the vehicle collision is moved in various directions, the driver MD can be protected accurately during the vehicle collision.

In the airbag 20 of the embodiment, the tethers 42L and 42R are provided in the airbag body 21 having a bag shape. The tethers 42L and 42R connect the driver-side wall part and the vehicle-side wall part in the inner portion of the area (rear portion 24) on the rear side from the inflow opening 27 in the airbag body 21, so as to regulate the thickness of the rear portion (rear area) 24 of the airbag body 21 at the time of completion of inflation. For this reason, when the airbag 20 is deployed and inflated, even in a case where the gap between a portion of the ring part R on the rear end side and the abdomen BA of the driver MD in the steering wheel W is narrow, the rear portion (rear area) 24 of the airbag body 21 can enter smoothly the narrow gap, and the airbag body 21 can be inflated rapidly.

In the airbag 20 of the embodiment, the tethers 42L and 42R are arranged in two places substantially symmetrical in the right and left direction with the inflow opening 27 as a center, and each have a belt shape. In a state where the airbag body 21 at the time of completion of inflation is viewed from above, the tethers 42L and 42R are arranged to be tilted with respect to the right and left direction such that the end edge parts 42a positioned on the right and left outer sides are positioned on the front side from the central edge parts 42b positioned on the right and left inner sides. For this reason, on the outside of the coupled portions 60L and 60R of the tethers 42L and 42R to the driver-side wall part 31 with the inflow opening 27 as a center, that is, in the vicinity of both right and left edges of the rear portion side of the driver-side wall part 31, the vicinity of the arm restraining parts 37L and 37R can be inflated in a wide range to have a predetermined thickness, and the arms AL and AR of the driver MD can be accurately restrained by the arm restraining parts 37L and 37R without hindrance to state where a front-collision restraining surface 32 is arranged substantially along the vertical direction. In other words, in the airbag 20 of the embodiment, in the airbag body 21, the area (the area which is tilted such that the center in the right and left direction is positioned on the rear side, and the outside in the right and left direction is positioned on the front side) of the tethers 42L and 42R which are arranged to be tilted with respect to the right and left direction can be inflated in a predetermined thickness. Thus, for example, the tether easily secures the thickness or the size of the arm restraining parts 37L and 37R formed from the right and left outer area of the tethers 42L and 42R compared to a case where the tether is arranged substantially along the right and left direction. Particularly, in the airbag 20 of the embodiment, as illustrated in FIG. 5, the tethers 42L and 42R are arranged in a position near the inside of the ring part R to be substantially along the ring part R when the airbag body 21 at the time of completion of inflation is viewed from above. Thus, it is possible to accurately regulate the thickness of the area which covers the upper surface of the ring part R in the rear portion 24, and a portion (arm restraining parts 37L and 37R) which is arranged on the rear side including the right and left outer sides from the ring part R when inflation is completed can be inflated to have a moderate thickness.

Figure 11:
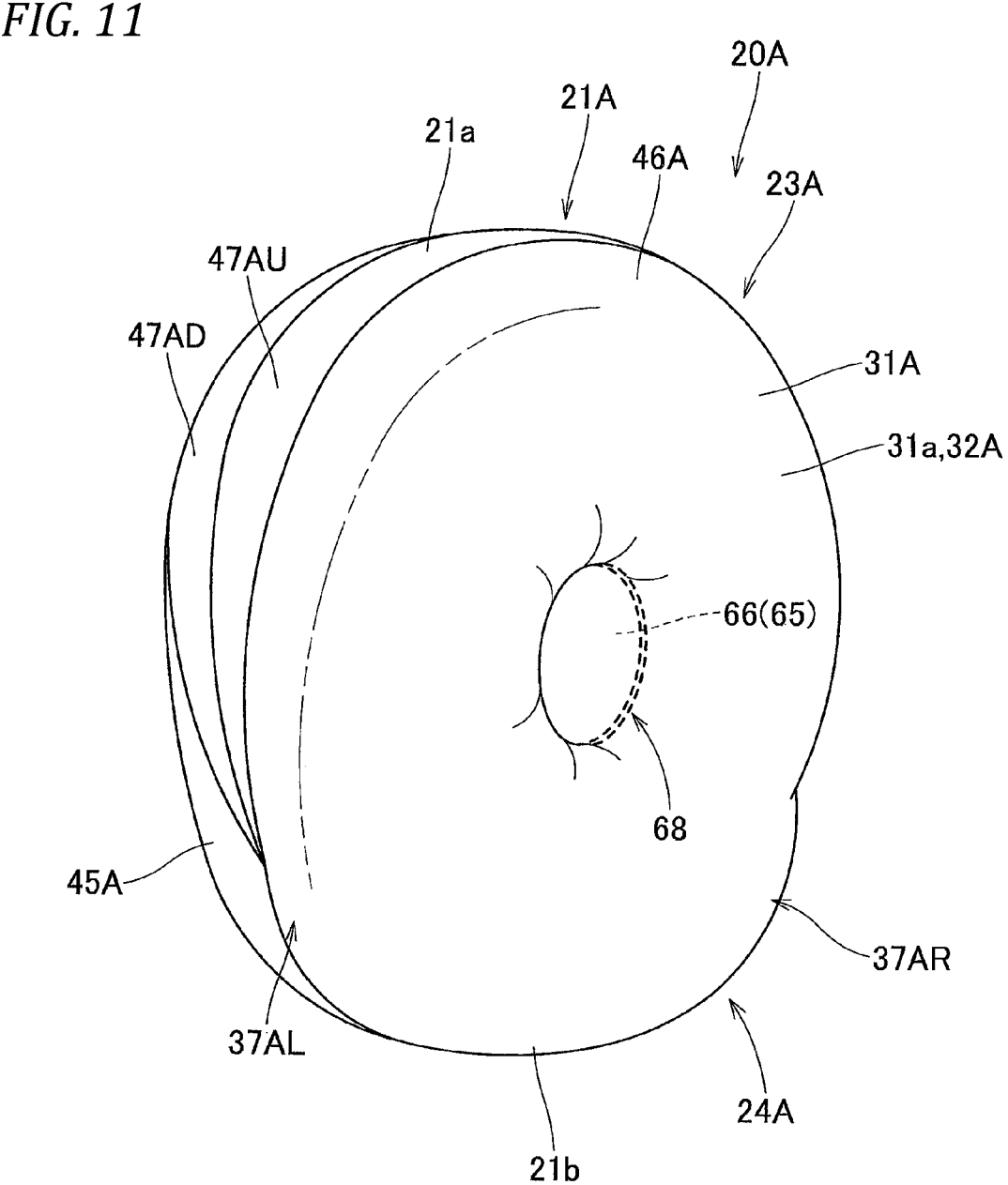
FIG. 11 is a perspective view illustrating a state where an airbag as another embodiment of the invention is inflated as a single body when viewed from the rear side.
Figure 12:
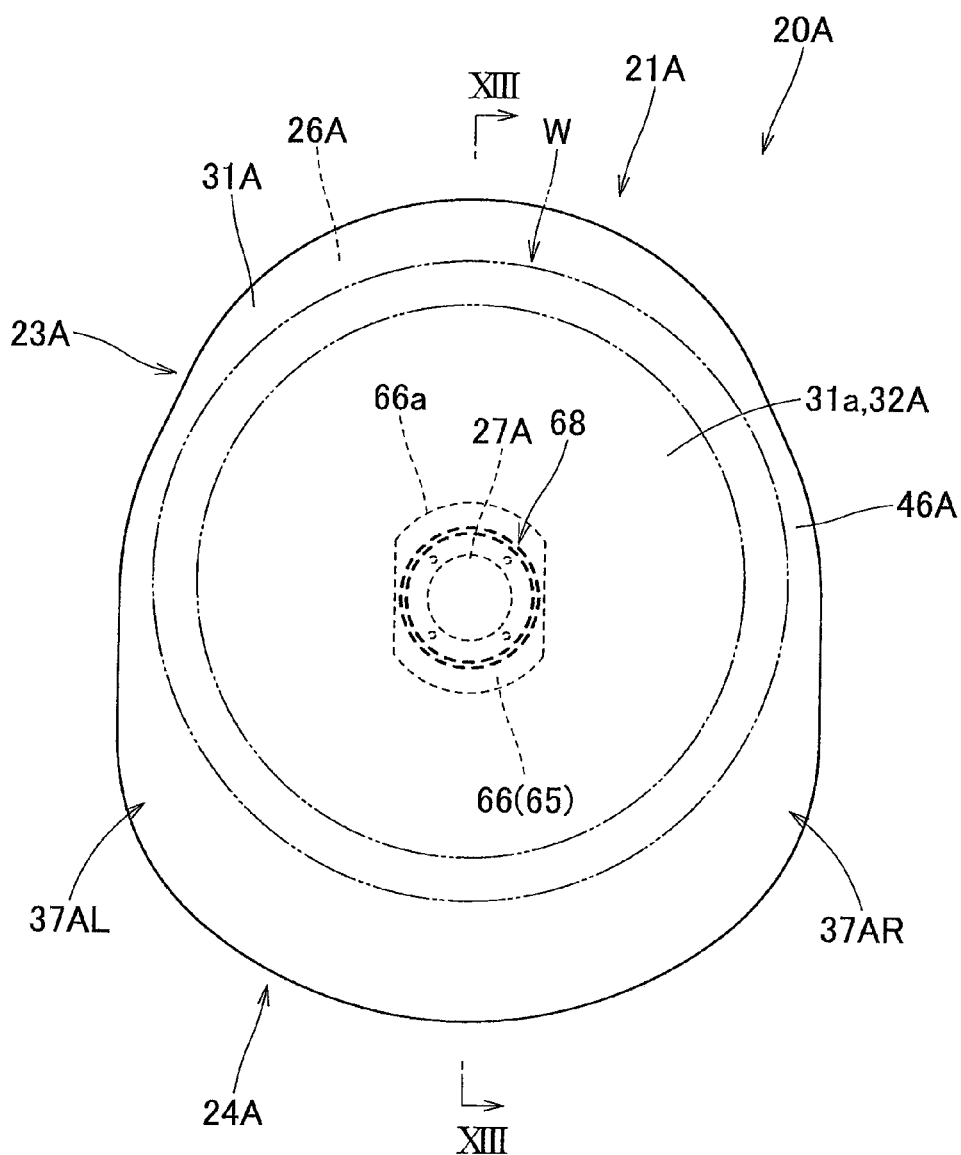
FIG. 12 is a plan view illustrating a state where the airbag of FIG. 11 is inflated as a single body.
Figure 13:
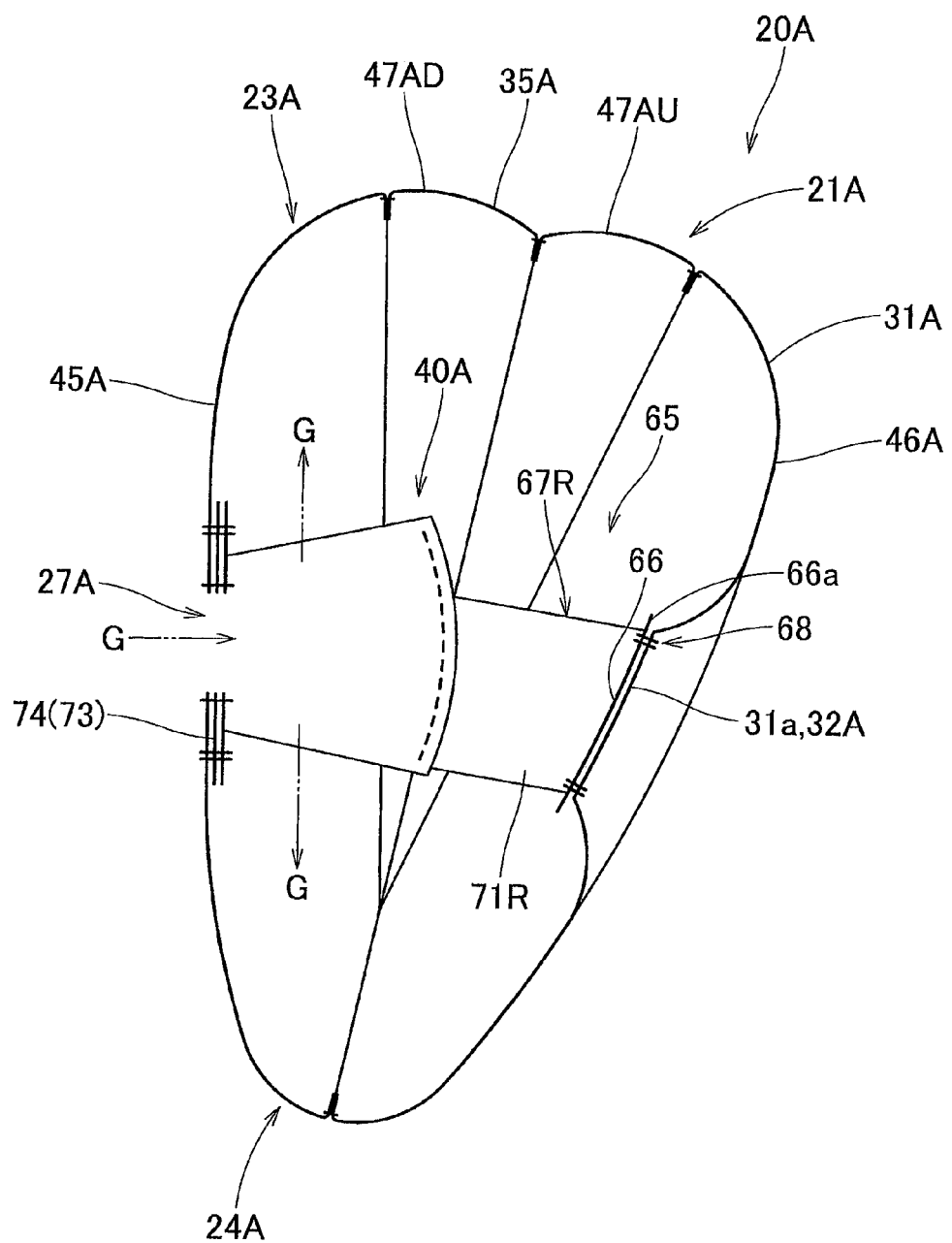
FIG. 13 is a sectional view of XIII-XIII portion of FIG. 12.

An airbag formed as illustrated in FIGS. 11 to 13 may be used as the airbag 20A. The airbag 20A includes an airbag body 21A, a flow-straightening cloth 40A arranged in the airbag body 21A, and a tether 65 which is arranged in the airbag body 21A to regulate the inflation completion shape of the airbag body 21A. In the airbag 20A, the airbag body 21A and the flow-straightening cloth 40A which are members other than the tether 65 have the same configuration as the airbag body 21 and the flow-straightening cloth 40 in the above-described airbag 20. Thus, in the same members, "A" is added to the end of the same reference numerals, and the detailed description is not given.

The tether 65 arranged in the airbag body 21A is provided to connect the substantially center of the front-collision restraining surface 32A in the driver-side wall part 31A and the vicinity of the inflow opening 27A in the vehicle-side wall part 26A. The tether 65 is formed to secure a flat state of the vicinity of substantially center of the front-collision restraining surface 32A when the airbag body 21A is inflated completely. Specifically, the tether 65 includes a substantially circular top plate part 66 which is arranged on the driver-side wall part 31A side, and tether bodies 67L and 67R which extend from both right and left edges of the top plate part 66 to be connected to the both right and left edges of the inflow opening 27A. As illustrated in FIG. 12, the top plate part 66 is arranged in the substantially central position of the driver-side wall part 31A. When the airbag body 21A at the time of completion of inflation is viewed from above, the top plate part 66 is positioned to substantially match with the inflow opening 27A. In the top plate part 66, the entire outer circumferential edge 66a is coupled (sewn) in the driver-side wall part 31A by a substantially circular coupled portion 68 (sewn portion). The tether bodies 67L and 67R are arranged to be substantially symmetrical in the right and left direction with the inflow opening 27A as a center. The tether bodies 67L and 67R are each configured in a belt shape such that the width direction is arranged substantially along the front and rear direction when the airbag body 21A is inflated completely.

Figure 14:
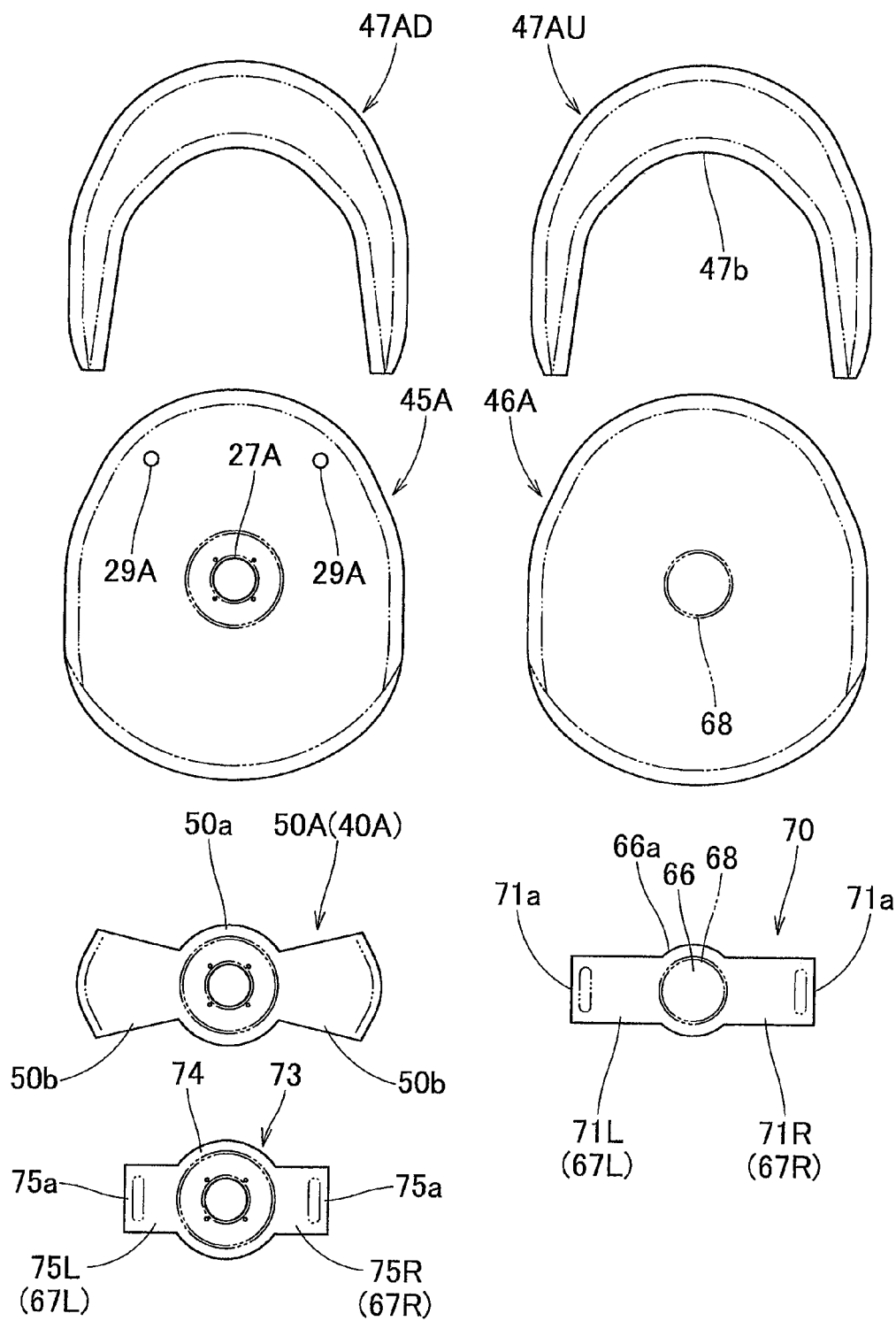
FIG. 14 is a plan view illustrating a basic fabric forming the airbag of FIG. 11.

In the case of the embodiment, as illustrated in FIG. 14, the tether 65 is formed of a tether basic fabric 70 arranged on the driver-side wall part 31A side, and a tether basic fabric 73 arranged on the vehicle-side wall part 26A side. The tether basic fabric 70 arranged on the driver-side wall part 31A side includes the circular top plate part 66, and main body components 71L and 71R which extend in a belt shape from both right and left edges of the top plate part 66. Similarly with the above-described airbag 20, the tether basic fabric 73 arranged on the vehicle-side wall part 26A includes a substantially circular reinforcing fabric 74 which reinforces the circumferential edge of the inflow opening 27A, and main body components 75L and 75R which extend in a belt shape from both right and left edges of the reinforcing fabric 74. Further, the tether bodies 67L and 67R are each formed by coupling (sewing) the tips 71a and 75a of the main body components 71L, 71R, 75L, and 75R which extend from the top plate part 66 and the reinforcing fabric 74 in which the outer circumferential edge is coupled with the driver-side wall part 31A or the vehicle-side wall part 26A (the circumferential edge of the inflow opening 27A) to each other. The tether bodies 67L and 67R are set to have such a length dimension that the separation distance in the vicinity of the center of the vehicle-side wall part 26A and the driver-side wall part 31A can be regulated when the airbag body 20A is inflated completely, and the driver-side wall part 31A (front-collision restraining surface 32A) can be arranged substantially along the vertical direction.

Figure 15:
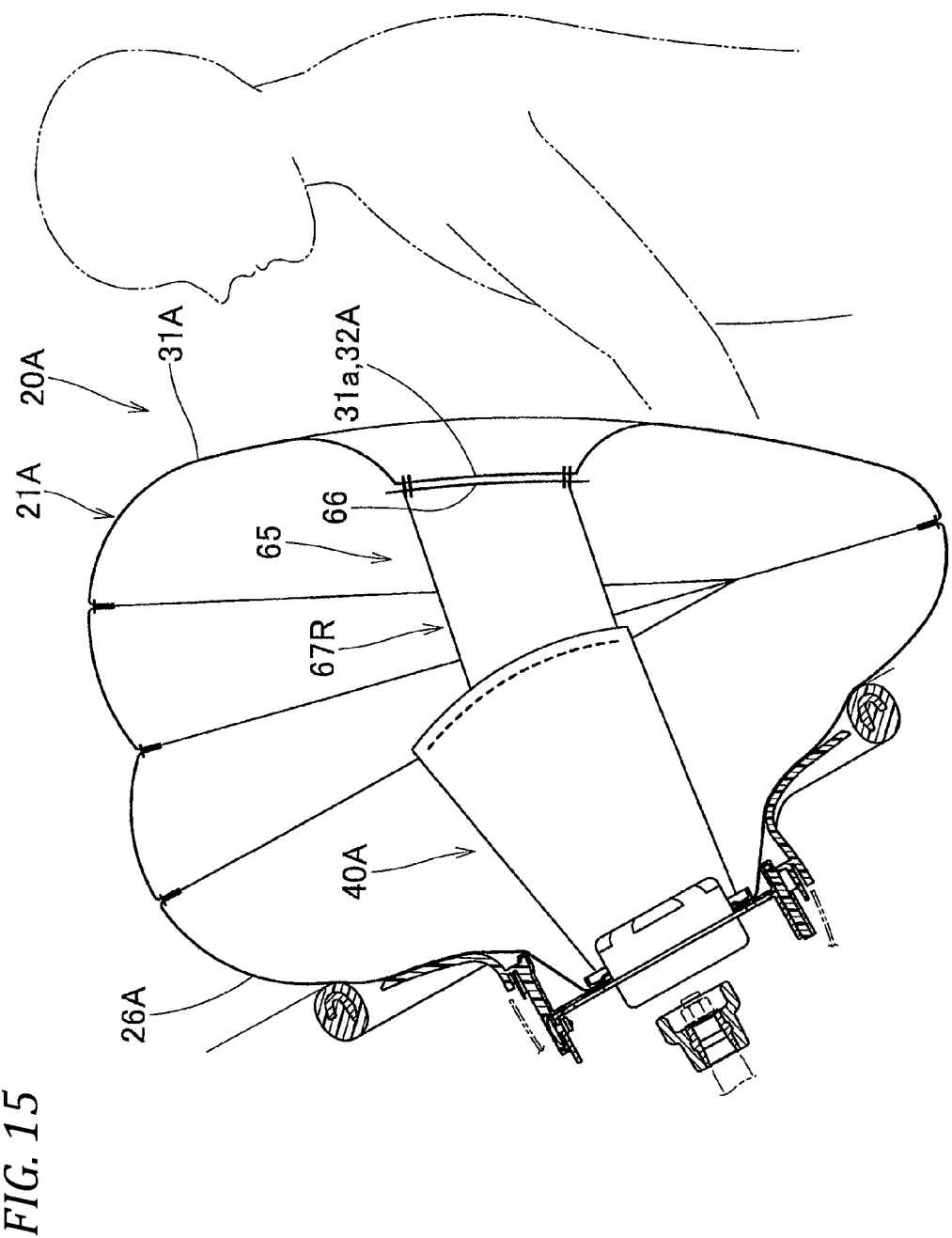
FIG. 15 is a schematic longitudinal sectional view illustrating the steering wheel airbag device which uses the airbag of FIG. 11 in a state where the airbag is completely inflated.

In the steering wheel airbag device using the above-configured airbag 20A, as illustrated in FIG. 15, the separation distance in the vicinity of the center of the vehicle-side wall part 26A and the driver-side wall part 31A can be regulated by the tether bodies 67L and 67R when the airbag body 21A is inflated completely. In addition, by preventing that an irregularity occurs partially, the front-collision restraining surface 32A can be arranged in a wide flat area to be substantially along the vertical direction. Particularly, in the embodiment, the tether 65 includes a circular top plate part 66 in which the outer circumferential edge is coupled with the entire driver-side wall part 31A. Thus, it is possible to stably maintain the flat state of the central area of the front-collision restraining surface 32A (driver-side wall part 31A). For this reason, the driver moving forward can be received more stably by the confronting front-collision restraining surface 32A having a wide flat shape. Incidentally, in the embodiment, the tether 67 is formed such that the tether bodies 67L and 67R extend from both right and left edges of the top plate part 66, and the flow-straightening cloth 40A is formed to straighten the flow of the inflation gas to the front and rear direction. However, the directions of the tether and the flow-straightening cloth may each be inversed, and the tether which is formed such that the tether body extends from the both front and rear edges of the top plate part, and the flow-straightening cloth which straightens the flow of the inflation gas to the right and left direction may be used in the airbag.

In a case where the tether 65 is used in the airbag, the tethers 42L and 42R used in the above-described airbag 20 may be used together. In addition, in the airbag 20A of the embodiment, a state (the state of being arranged substantially along the vertical direction) where the driver-side wall part 31A is arranged when inflation is completed is set by gradually reducing the width dimension of the side wall part 35A toward the rear end 35b. However, the airbag may have a substantially constant width dimension of the side wall part in the front and rear direction without difference, and may be formed such that a state (the inflation completion shape of the airbag body) where the driver-side wall part is arranged when inflation is completed is regulated by the tether arranged in the center of the driver-side wall part.

What is claimed is:

1. A steering wheel airbag which is inflated by allowing inflation gas to flow therein,
    and is arranged to cover a steering wheel when inflation is completed, the steering wheel airbag comprising:
    a driver-side wall part disposed on a side of a driver when inflation is completed;
    a vehicle-side wall part which is arranged on a side of the steering wheel to face the driver-side wall part;
    a side wall part which is arranged to connect outer circumferential edges of the driver-side wall part and the vehicle-side wall part, wherein:
    in the vehicle-side wall part, an inflow opening to allow the inflation gas to flow therein is formed in a substantially central position of front and rear sides and right and left sides;
    when inflation is completed, a front portion which is on a front side from a center of the inflow opening has a substantially semicircular shape when viewed from above, and a rear portion which is on a rear side from the center of the inflow opening has a substantially rectangular shape in which a width dimension in the right and left direction is substantially constant;
    a driver-side panel forming the driver-side wall part and the vehicle-side panel forming the vehicle-side wall part are formed in a substantially elliptical shape to have a same outer shape;
    two pieces of side wall-side panels forming the side wall part have a same outer shape;
    the side wall-side panels are formed in a curved belt shape such that the outer circumferential edge substantially matches with the outer circumferential edges of the vehicle-side panel and the driver-side panel except for the rear edges to have a widest central area and to be converged toward both ends so that inner circumferential edges are coupled to each other;
    one outer circumferential edge is connected to the outer circumferential edge of the driver-side panel except for the rear edge, and the other outer circumferential edge is connected to the outer circumferential edge of the vehicle-side panel except for the rear edge;
    a front-collision receiving surface is arranged on the side of the driver when inflation is completed, so as to receive the driver moving forward during a head-on collision of a vehicle; and
    the front-collision receiving surface is arranged substantially along a vertical direction to be tilted with respect to a ring surface of the steering wheel when inflation is completed.

2. The steering wheel airbag according to claim 1, further comprising:
    an airbag body having a bag shape; and
    a tether which is arranged in the airbag body to regulate an inflation completion shape of the airbag body, wherein:
    the airbag body includes a driver-side wall part forming the front-collision receiving surface and a vehicle-side wall part which is arranged on a side of the steering wheel to face the driver-side wall part when inflation is completed, and is provided with an inflow opening for allowing the inflation gas to flow therein in the vehicle-side wall part; and
    the tether connects the driver-side wall part and the vehicle-side wall part in an area which is on a rear side from the inflow opening in an axis-orthogonal direction of a steering shaft for assembling the steering wheel, so as to regulate a thickness of a rear area of the airbag body at the time of completion of inflation when the airbag body is inflated completely.

3. The steering wheel airbag according to claim 2, wherein
    the tethers are arranged in a belt shape in two places substantially symmetrical in a right and left direction with the inflow opening as a center, and are arranged to be tilted with respect to the right and left direction such that end edge parts positioned on right and left outer sides are positioned on the front side from central edge parts positioned on right and left inner sides when the airbag body at the time of completion of inflation is viewed from above along the an axial direction of the steering shaft.

4. The steering wheel airbag according to claim 1, further comprising:
    an airbag body having a bag shape; and
    a tether which is arranged in the airbag body to regulate an inflation completion shape of the airbag body, wherein:
    the airbag body includes a driver-side wall part forming the front-collision receiving surface and a vehicle-side wall part which is arranged on a side of the steering wheel to face the driver-side wall part when inflation is completed, and is provided with an inflow opening for allowing the inflation gas to flow therein in the vehicle-side wall part; and
    the tether is arranged to connect a substantially center of the front-collision receiving surface in the driver-side wall part and a vicinity of the inflow opening in the vehicle-side wall part, so as to secure a flat state near the substantially center of the front-collision receiving surface when the airbag body is inflated completely.

* * * * *